United States Patent [19]
Bullen et al.

[11] Patent Number: 5,709,769
[45] Date of Patent: Jan. 20, 1998

[54] DUCT ASSEMBLY SYSTEM

[75] Inventors: George Nicholas Bullen, Oxnard; Stephen A. Brazil, Palmdale; Douglas D. Decker, Redondo Beach; Ian MacAllister, Irvine, all of Calif.

[73] Assignee: Northrop Grumman Corporation, Los Angeles, Calif.

[21] Appl. No.: 490,191

[22] Filed: Jun. 14, 1995

[51] Int. Cl.$^6$ ........................................ B28B 7/30
[52] U.S. Cl. ........................ 156/423; 156/294; 249/11; 249/180; 249/185
[58] Field of Search ........................ 156/423, 294; 249/185, 184, 180, 11, 83, 152; 269/48.1, 48.2

[56] References Cited

U.S. PATENT DOCUMENTS

| | | | |
|---|---|---|---|
| 1,460,165 | 6/1923 | McArthur | 249/185 |
| 1,498,651 | 6/1924 | Folwell | 249/185 |
| 1,524,325 | 1/1925 | Venable | 249/11 |
| 1,621,538 | 3/1927 | Heller | 249/11 |
| 2,020,519 | 11/1935 | Sarosdy | 249/185 |
| 2,020,520 | 11/1935 | Sarosdy | 249/11 |
| 3,331,723 | 7/1967 | Grace | 156/423 |
| 3,558,124 | 1/1971 | McMichael | |
| 3,852,016 | 12/1974 | Delauzun | 249/185 |
| 3,863,910 | 2/1975 | Warax | |
| 3,880,415 | 4/1975 | Fujioka et al. | |
| 4,143,774 | 3/1979 | Poulson | |
| 4,233,020 | 11/1980 | Oswald | |
| 4,463,938 | 8/1984 | Dearman | |
| 4,582,241 | 4/1986 | Johnson | |
| 4,708,279 | 11/1987 | Dearman | |

FOREIGN PATENT DOCUMENTS

| | | | |
|---|---|---|---|
| 0197801 | 1/1978 | U.S.S.R. | 156/423 |
| 0857399 | 8/1981 | U.S.S.R. | 249/11 |

*Primary Examiner*—Daniel Stemmer
*Attorney, Agent, or Firm*—Terry J. Anderson; Karl J. Hoch, Jr.

[57] ABSTRACT

The present invention is embodied in a duct assembly system for the shaping and support of skins against a bulkhead, including an articulating skin expanding member conforming, in an extended position, to a cross section of the bulkhead, and a support means attached to the expanding member for insertion of the expanding member into the skins and alignment of the expanding member adjacent to the bulkhead.

14 Claims, 2 Drawing Sheets

DUCT ASSEMBLY SYSTEM

BACKGROUND OF THE INVENTION

TECHNICAL FIELD

The present invention relates to a duct assembly system for the shaping and support of structural components, such as skins, to a bulkhead for the purpose of fastening the component to the bulkhead.

BACKGROUND ART

In the manufacture of jet aircraft, the assembly of the engine intake ducts to the aircraft bulkheads has posed a major assembly problem that has been previously overcome by numerous manual assembly steps. These steps have not only been costly and time consuming, but they have also required difficult physical manipulation steps by assemblers.

The ducts are comprised of curved sections of metal or composite sheets known as "skins". The skins are to be inserted into the aircraft bulkheads and held in place using various conventional support devices, such as c-clamps or temporary interlocking fasteners that attach to each bulkhead, known as "clickos". These manual positioning methods present several disadvantages. Initially, the manual insertion of the skins into the bulkhead structure requires extensive physical lifting, bending and supporting maneuvers by assembly personnel until the support devices are attached. In addition, the pressure exerted by the support devices, such as clickos, against the bulkheads varies and can cause the skins to warp and bend.

These manual assembly tools also cause difficulties for assembly personnel because of the manner in which the skins must be fastened to the bulkheads. The skins must be attached to the bulkheads by inserting fasteners from the interior side of the skin into the bulkhead because the interior of the duct must remain smooth to maintain the laminar flow of intake air and because there is no access from the bulkhead side of the ducts to insert the fasteners. Thus, personnel must be inside the duct while drilling fasteners into the bulkheads. Unfortunately, the assembly tools described earlier, such as c-clamps and clickos, extend into the duct interior and substantially interfere with the movement of assembly personnel while they are inside the duct fastening the skins to the bulkheads.

These problems are compounded if the skins are made of composite materials, such as a graphite epoxy, because a liquid shim, such as an epoxy resin, must be used between the skin and bulkhead to assure a permanent bond. In order to cure this shim, a uniform pressure is required to be applied over the surface between the bulkhead and skin during a cure period, which can be approximately 24 hours. It is difficult for the conventional support devices described earlier to achieve such a uniform pressure and to maintain it over such a long cure period.

The need to achieve and maintain a uniform outward pressure over the contact surface between the bulkhead and skin is complicated by the fact that the cross sections of a duct frequently vary within a duct from a circular shape to other arcuate shapes. Using the conventional clamping devices, many more devices are needed to achieve uniform outward pressure at each cross section in ducts that have varying cross sections, as compared to a duct with uniformly circular cross sections.

SUMMARY OF THE INVENTION

The present invention is embodied in a duct assembly system for the shaping and support of skins against a bulkhead, including an articulating skin expanding member conforming, in an expanded position, to a cross section of the bulkhead, a support means attached to the expanding member for insertion of the expanding member into the skins and alignment of the expanding member adjacent to the bulkhead, and a power source to extend the expanding member.

DETAILED DESCRIPTION OF THE PREFERRED EMBODIMENT

Figure 1:
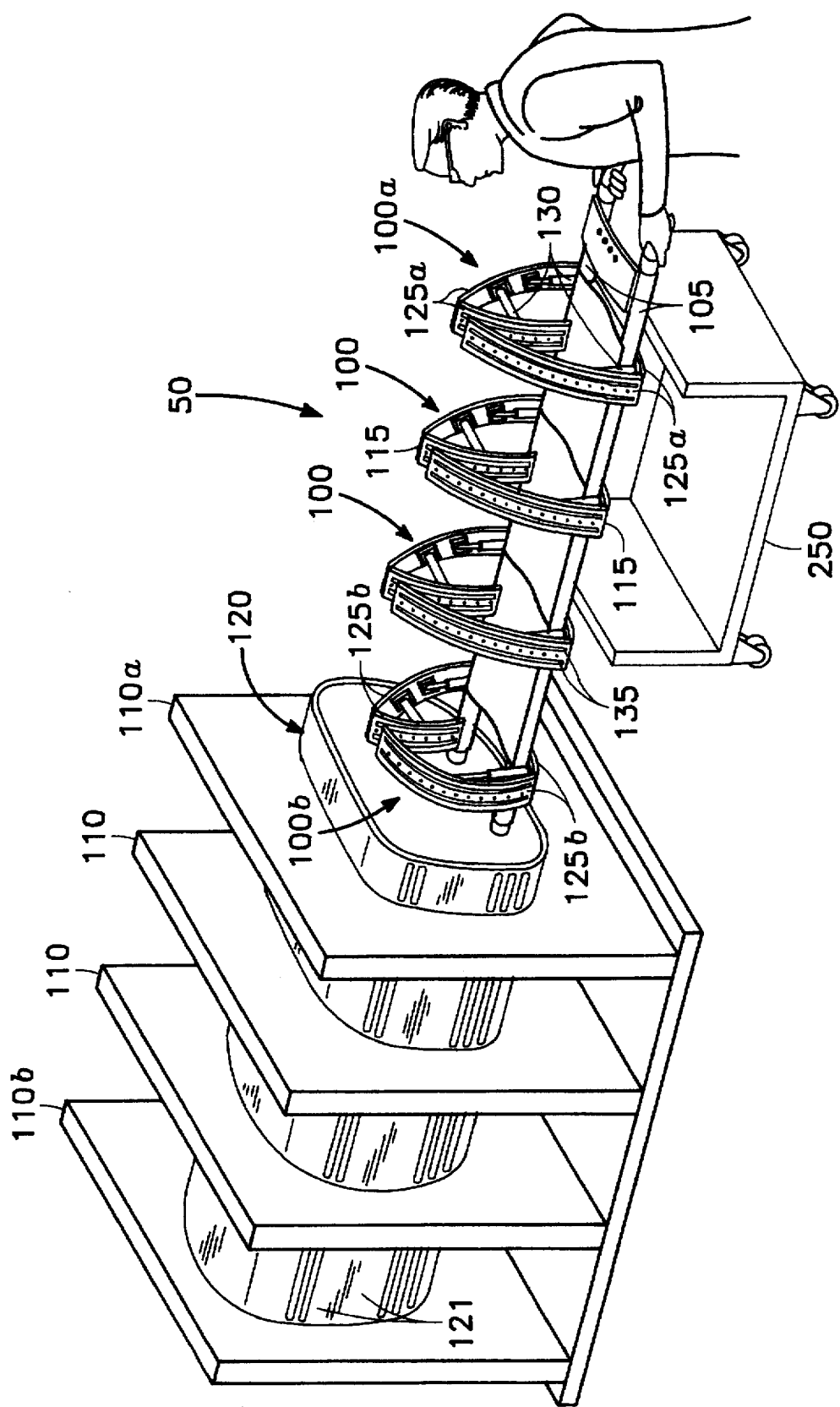
FIG. 1 is a perspective view of a system of the present invention in a collapsed position being inserted into a bulkhead structure.

As shown in FIG. 1, the duct assembly system 50 includes articulating skin expanders 100 that are mounted on support tubes 105 at distances corresponding to the spacing between bulkheads 110. The expanders 100 are segmented by hinges 115, the number of which is determined by the shape of a particular bulkhead 110 against which the expander must be positioned. For example, in FIG. 1 expander 100a has four expander segments 125 because the cross section shapes of the bulkheads 110 are generally square with rounded corners. In addition, the shape of each expander segment 125 depends on the shape of the specific bulkhead against which it is positioned. For example, in FIG. 1, the expander segments 125b of expander 100b are more arcuate in shape than expander segments 125a of expander 100a because the cross section of the duct 120 is more curved at bulkhead 110b than bulkhead 110a.

Air cylinders 130 are mounted intermediate each pair of expander segments 125 that are joined by a hinge 115. The support tubes 105 contain air pressure lines (not shown) that transport pressurized air to the air cylinders 130. Each expander segment 125 contains one or more bladder segments 135 that also receive pressurized air from the air pressure lines in the support tubes 105.

Figure 2:
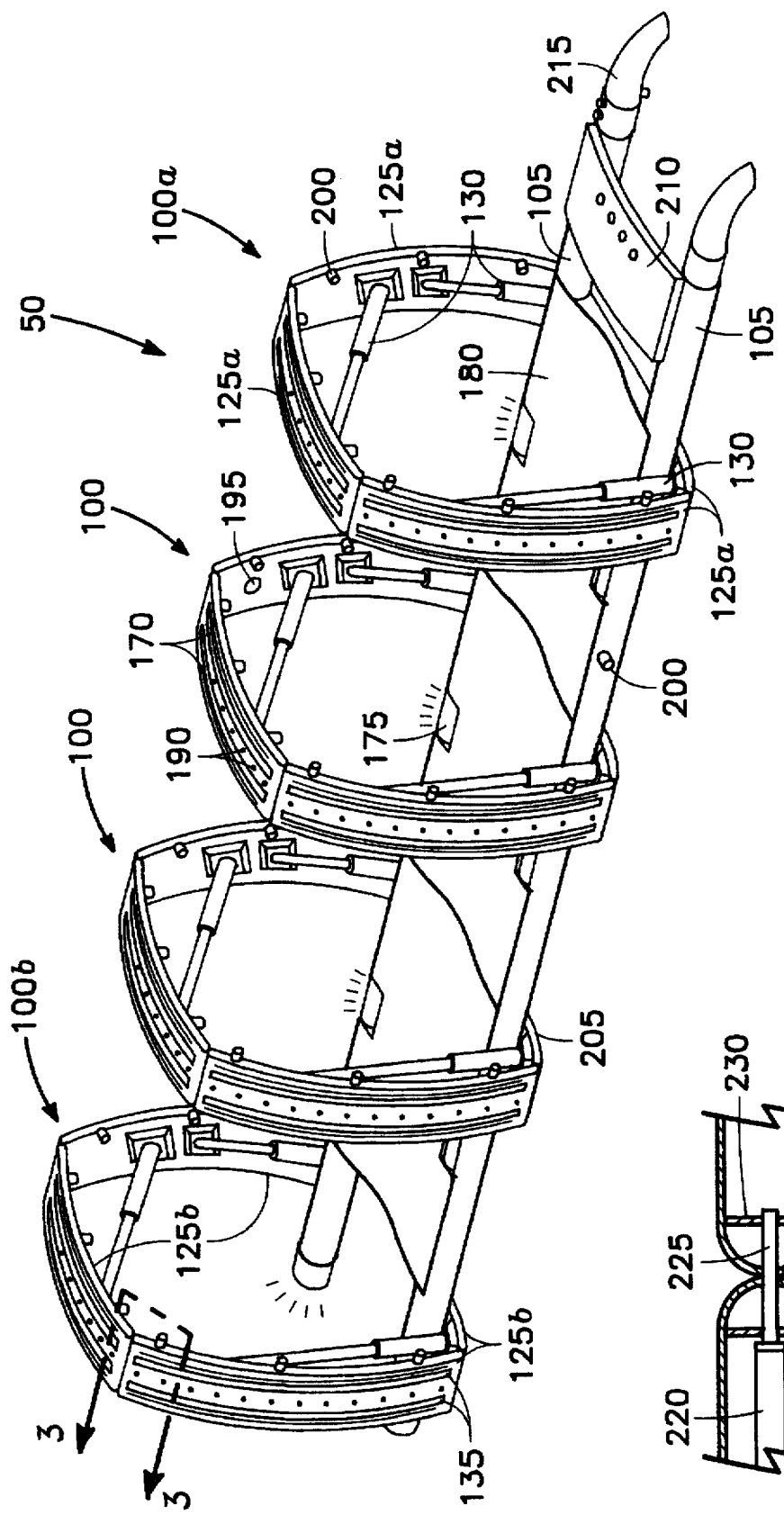
FIG. 2 is a perspective view of the system of FIG. 1 in an expanded position.

As shown in FIG. 2, one or more heating coils 170 may be mounted in each expander segment 125 when a composite material is used to form the duct 120. The support tubes 105 contain electrical conducting means (not shown) to carry electric current to the heating coils 170. Observation lights 175 are mounted in tubes 105 or expander segments 125 and also receive electric current from the conducting means in the tubes 105. Removable work platforms 180 are mounted on the tubes 105 by hinges or other suitable attachment means for the support of assembly personnel working inside the skin expanders 100 after they have been extended by air cylinders 130.

A series of bushings 190 are mounted on each expander segment 125. The bushings 190 are spaced at positions on the expander segments 125 where it has been determined suitable for holes to be drilled in the skins and fasteners inserted to secure the skins to the bulkheads 110. Bushings 190 may also be fitted with twist interlock adapters 195 for the attachment of automatic drills, for "peck drilling".

The expander segments 125 and tubes 105 are also fitted with air flow nozzles 200 that receive air from the air pressure lines in the tubes 105 and exhaust the air through the open ends of the duct 120 during assembly. The expander segments 125 that are mounted under the tubes 105 are also fitted with bearings 205, such as air bearings or nylon bearings, to facilitate insertion of the system 50 in the duct 120 prior to extension of the expanders 125.

The support tubes 105 are connected at one end with a control panel 210 that contains appropriate control switches for lights 175, cylinders 130, coils 170 and nozzles 200. The control panel is also provided with manipulation means 215, such as handles, to insert the system 50 in the duct 120.

Figure 3:
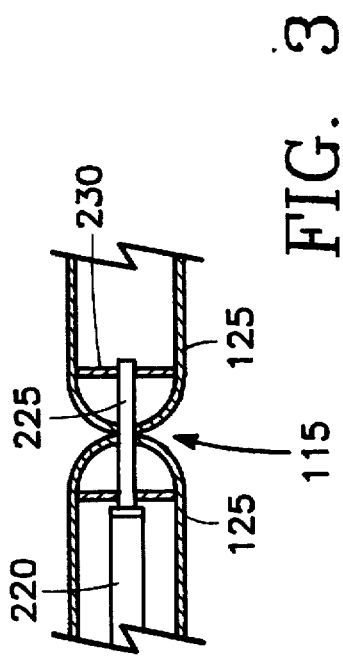
FIG. 3 is a partial cross sectional view along the line 3—3 of FIG. 2

As shown in FIG. 3, a locking air cylinder 220 joins the expander segments 125 that are not joined by hinges 115 (as show in FIG. 1). A locking pin 225 is extended by cylinder 220 from the expander segment 125 containing the cylinder 220 into a locking plate 230 in the expander segment 125 to be joined.

Prior to operation of the system 50, the skins 121 comprising the duct 120 must be temporarily mounted and aligned in the bulkheads 110 by means of conventional c-clamps. If the skins 121 are made of composite materials, a liquid shim such as an epoxy resin is applied to the skins 121 along the portion of the skins 121 that will contact the bulkheads. Since the liquid shim begins to cure almost immediately, the system 50 is then quickly transported in an unexpanded position as shown in FIG. 1 to the duct 120. Any suitable transporting means, such as a collapsible stand 250, may be used to maneuver the system 50 adjacent the duct 120.

An operator then pushes the system 50 into the duct 120 by using the manipulation means 215, sliding on bearings 205 until the expanders 100 are aligned with the bulkheads 110. Pressurized air is then released to the cylinders 130 by means of an appropriate switch on the control panel 210 to expand the expander segments 125 to conform to the cross sections of the bulkheads 110. The operator then activates cylinders 220 to lock the ends of expander segments 125 that are not joined by hinges 115 in order that the expanders 100 form rigid assemblies.

Bladders 170 are then inflated to apply uniform outward pressure against the skins 121 to the bulkheads 110 to shape the skins to the bulkhead and support it during assembly of the skins to the bulkhead. Typically, a pressure of 30 pounds per square inch is used for skins of a thickness of 0.130 inch. Holes may then be drilled through the skins 121, using the bushings 190 as guides, and into the bulkheads 110 for insertion of fasteners to complete the assembly operation. If the skins 121 are made of a composite material and a liquid shim was applied as described earlier, the heating coils 170 may be activated to accelerate the curing cycle for the liquid shim. This heating reduces the cure period, for example, from 24 hours to 72 minutes for liquid shim made of epoxy resin. During the curing process, the nozzles 200 are activated to remove any fumes released by the curing process. After the shim has cured, the holes may then be drilled in the skins 121.

Assembly of aircraft engine ducts or other structural components into frames using the present invention has several significant advantages over conventional assembly techniques. A major advantage is the savings in time and cost in completing such operations using the invention. The time previously spent in installing and removing the temporary support devices, such as clickos, is avoided. In addition, the inconvenience and time spent by assembly personnel in avoiding such devices while drilling holes in the duct is avoided. The improved assembler access provided inside the duct also reduces assembler fatigue, accidents and results in fewer errors in the drilling of holes.

In addition, the invention applies a uniform outward pressure on the components irrespective of the cross section shapes of the frames or bulkheads to which the components are being attached by using expanding sections that conform to each such cross section and pressurized bladders. This uniform pressure enables more precise placement of holes and skins, which eliminates stress induced deformations at the clamping points (i.e. using clickos) caused by the curing process.

If the components are made of composite materials, the invention also offers some unique and very specific advantages. Since the invention applies a more uniform pressure than conventional methods to the portion of skins to which liquid shim is applied, the strength and uniformity of the bond is improved. The invention also applies heat during the curing cycle, which drastically reduces the curing time required to reach full bond strength and results in a significant cost savings. The invention also provides means to evacuate the fumes from the curing process which enables assemblers to enter the duct sooner for inspection and assembly operations.

Although the present invention has been described with reference to preferred embodiments, workers skilled in the art will recognize that changes may be made in form and detail without departing from the spirit and scope of the invention.

What is claimed:

1. A duct assembly system for shaping and supporting a skin against a bulkhead to form a duct, comprising:

an articulating skin expanding member conforming, in an expanded position, to a cross section of said bulkhead, said expanding member applying uniform pressure on the skin against the bulkhead and comprising a plurality of bushings for drilling fastener holes in said skin; and support means for insertion of said expanding member into said duct and alignment of said expanding member adjacent to said bulkhead.

2. The system of claim 1 wherein said expanding member comprises a plurality of hinged skin expanding segments; and an actuator to expand and collapse said segments.

3. The system of claim 2 wherein said actuator comprises an air cylinder disposed between adjacent hinged segments.

4. The system of claim 2 wherein said expanding member further comprises skin expanding segments having at least two unhinged ends; and locking means to secure said unhinged ends.

5. The system of claim 1 wherein said expanding member further comprises a skin expanding bladder for exerting pressure on said skin against said bulkhead.

6. The system of claim 1 wherein said expanding member further comprises heating coils for curing adhesive applied to a bulkhead facing surface of said skin.

7. The system of claim 1 further comprising illumination means affixed to said expanding members.

8. The system of claim 1 further comprising illumination means affixed to said support means.

9. The system of claim 1 further comprising air introduction nozzles affixed to said expanding members for providing ventilation; and a source of pressurized air connected to said nozzles.

10. The system of claim 1 further comprising air introduction nozzles affixed to said support means for providing ventilation; and a source of pressurized air connected to said nozzles.

11. The system of claim 1 further comprising a plurality of said expanding members affixed to said support means at positions corresponding to positions of a plurality of bulkheads to which said duct is assembled.

12. A duct assembly system for shaping and supporting a skin against a bulkhead, comprising:

means for expanding and uniformly applying pressure against said skin against a cross-section of said bulkhead, said expanding means comprising a plurality of bushings for drilling fastener holes in said skin;

means to support and align said expanding means adjacent to said bulkhead; and an actuator to expand said expanding means.

13. The system of claim 12 wherein said expanding means comprises hinged collar segments having at least two unhinged ends; and locking means to secure said unhinged ends.

14. The system of claim 12 further comprising a plurality of said expanding means affixed to said support means at positions corresponding to positions of a plurality of bulkheads to which said duct is assembled.

* * * * *